United States Patent
Childs

(10) Patent No.: US 11,672,198 B2
(45) Date of Patent: Jun. 13, 2023

(54) CUT QUALITY DETECTION SYSTEM FOR AN AGRICULTURAL MOWER

(71) Applicant: CNH Industrial America LLC, New Holland, PA (US)

(72) Inventor: Albert Childs, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 491 days.

(21) Appl. No.: 16/803,242

(22) Filed: Feb. 27, 2020

(65) Prior Publication Data
US 2021/0267121 A1    Sep. 2, 2021

(51) Int. Cl.
| | | |
|---|---|---|
| *A01D 34/00* | (2006.01) | |
| *G01J 3/50* | (2006.01) | |
| *G01J 3/46* | (2006.01) | |
| *A01D 43/00* | (2006.01) | |
| *A01D 34/13* | (2006.01) | |
| *A01D 34/66* | (2006.01) | |
| *A01D 101/00* | (2006.01) | |

(52) U.S. Cl.
CPC ......... *A01D 34/006* (2013.01); *A01D 34/664* (2013.01); *G01J 3/50* (2013.01); *A01D 2101/00* (2013.01)

(58) Field of Classification Search
CPC ................ A01D 34/006; A01D 34/664; A01D 2101/00; A01D 34/667; A01D 43/10; A01D 34/00; A01D 43/00; G01J 3/50; G01J 3/00
See application file for complete search history.

(56) References Cited

U.S. PATENT DOCUMENTS

| | | | |
|---|---|---|---|
| 5,204,814 A * | 4/1993 | Noonan ............... | G05D 1/0265 701/25 |
| 8,086,378 B2 | 12/2011 | Behnke | |
| 8,406,966 B2 * | 3/2013 | Schedgick ........... | A01B 63/112 172/7 |
| 9,723,784 B2 | 8/2017 | Bremer et al. | |
| 10,188,036 B2 | 1/2019 | Loukili et al. | |
| 2005/0055147 A1 * | 3/2005 | Hrazdera ............. | A01B 79/005 701/50 |
| 2012/0023887 A1 * | 2/2012 | Messina ................ | B60L 3/0061 56/320.1 |

(Continued)

FOREIGN PATENT DOCUMENTS

| | | | | |
|---|---|---|---|---|
| EP | 857325 B1 * | 5/2002 | .......... | G05D 1/0011 |
| EP | 3905109 A1 * | 11/2021 | ............ | A01B 61/04 |

(Continued)

*Primary Examiner* — Yonel Beaulieu
(74) *Attorney, Agent, or Firm* — Peter Zacharias

(57) ABSTRACT

An agricultural mowing assembly that includes an agricultural vehicle and at least one mowing device connected to the agricultural vehicle. The at least one mowing device includes a frame and a cutter bar movably connected to the frame. The cutter bar is configured for mowing a crop material in a field. The agricultural mowing assembly also includes a cut quality detection system that includes a plurality of sensors connected to the frame and configured for sensing color variations on the field and a controller operably connected to the plurality of sensors and receiving the sensed color variations on the field from the plurality of sensors. The controller is configured for determining a cut quality of the cutter bar based upon the sensed color variations on the field.

20 Claims, 5 Drawing Sheets

(56) References Cited

U.S. PATENT DOCUMENTS

| | | | |
|---|---|---|---|
| 2018/0068416 A1* | 3/2018 | Chandra | A01B 79/005 |
| 2019/0150357 A1* | 5/2019 | Wu | G06T 7/73 |
| 2021/0267121 A1* | 9/2021 | Childs | A01D 43/10 |

FOREIGN PATENT DOCUMENTS

| | | | |
|---|---|---|---|
| WO | 2019/140512 A1 | 7/2019 | |
| WO | WO-2021089813 A2 * | 5/2021 | A01B 61/04 |

* cited by examiner

CUT QUALITY DETECTION SYSTEM FOR AN AGRICULTURAL MOWER

BACKGROUND OF THE INVENTION

The present invention pertains to agricultural mowing devices and, more specifically, to a system for detecting the cutting performance of an agricultural mowing device.

Mowers and mower conditioners are often employed to cut crop material, such as hay or grass, and deposit the cut crop into windrows in a field. For cutting smaller fields, a single pull-type mower or mower conditioner may be attached to the rear of an agricultural driving vehicle. For cutting large fields, the driving vehicle may push a front mounted mower or mower conditioner and optionally tow an additional rear mounted mower or mower conditioner.

A typical mower generally includes a frame, a hitch coupled to the vehicle, and a cutter bar such as a sickle bar or rotary disc cutter bar for severing the crop from the field. The mower may further include other elements such as a reel to assist crop feeding, an auger or belts to convey crop to a central discharge point, and a flail or set of rollers for conditioning crop as it is ejected rearwardly out of the mower. A disc cutter bar generally includes multiple juxtaposed cutterheads for cutting the standing crop. Each cutterhead may consist of a rotating disc with diametrically opposed cutting blades or knives affixed to the body of the disc.

In a given mowing operation, it is desirable to optimize the cutting performance of the cutter bar. For instance, it is favorable to evenly cut the field without leaving streaks of crop, which thereby reduces crop yield and may impact subsequent field operations such as baling. Generally, the operator of the vehicle will adjust the machines operating parameters and configurations based upon his own subjective observations of the performance of the cutter bar. A skilled operator may recognize that uncut streaks of crop are present on the field and may accordingly adjust the vehicle and/or mower settings, such as the speed, position, or angle of the mower. The skilled operator may even deduce that a portion of the cutter bar is damaged and needs to be replaced. However, an unskilled operator may not make such an observation; and hence, the operator may continue mowing with a poor-quality cutting performance of the cutter bar. Thereby, the cutting performance of the cutter bar is often dependent upon the skill level of a particular operator.

What is needed in the art is a system for automatically detecting the cutting performance of a cutter bar of an agricultural mowing device.

SUMMARY OF THE INVENTION

In one exemplary embodiment formed in accordance with the present invention, there is provided an agricultural mowing assembly that includes an agricultural vehicle, one or more mowing devices, and a cut quality detection system. The cut quality detection system includes multiple sensors for sensing color variations on the filed and a controller. The controller is configured for determining a cut quality of the cutter bar of the mowing device based upon the sensed color variations on the field which are sensed by the sensors. Thereafter, the operator and/or controller may adjust one or more operating parameters of the agricultural vehicle or mowing device as desired in order to achieve a good quality cutting performance of the cutter bar of the mowing device. Additionally, the controller may determine and indicate to the operator that a portion of the cutter bar is damaged and needs to be replaced.

In another exemplary embodiment formed in accordance with the present invention, there is provided an agricultural mowing assembly that includes an agricultural vehicle and at least one mowing device connected to the agricultural vehicle. The at least one mowing device includes a frame and a cutter bar movably connected to the frame. The cutter bar is configured for mowing a crop material in a field. The agricultural mowing assembly also includes a cut quality detection system that includes a plurality of sensors connected to the frame and configured for sensing color variations on the field and a controller operably connected to the plurality of sensors and receiving the sensed color variations on the field from the plurality of sensors. The controller is configured for determining a cut quality of the cutter bar based upon the sensed color variations on the field.

In yet another exemplary embodiment formed in accordance with the present invention, there is provided a method for operating an agricultural mowing assembly. The method includes an initial step of providing an agricultural vehicle and at least one mowing device connected to the agricultural vehicle. The at least one mowing device includes a frame and a cutter bar movably connected to the frame. The cutter bar is configured for mowing a crop material in a field. The method also includes providing a cut quality detection system. The cut quality detection system includes a plurality of sensors connected to the frame and a controller operably connected to the plurality of sensors. The method further includes the steps of mowing the field by the at least one mowing device, sensing, by the plurality of sensors, color variations on the field, and determining, by the controller, a cut quality of the cutter bar based upon the sensed color variations on the field.

One possible advantage of the exemplary embodiment of the cut quality detection system is that the controller automatically and efficiently determines the cutting performance of the cutter bar of the mowing device by way of sensed color variations between the color of the field and the color of the crop material.

Another possible advantage of the exemplary embodiment of the cut quality detection system is that the operating parameter may be manually adjusted by the operator and/or automatically by the controller upon the controller determining the cutting performance of the cutter bar so that the performance and overall efficiency of the mowing device may be augmented.

Yet another possible advantage of the exemplary embodiment of the cut quality detection system is that the controller may automatically pinpoint the specific section of the cutter bar that is cutting poorly based upon which sensor location is detecting an undesired color variation.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
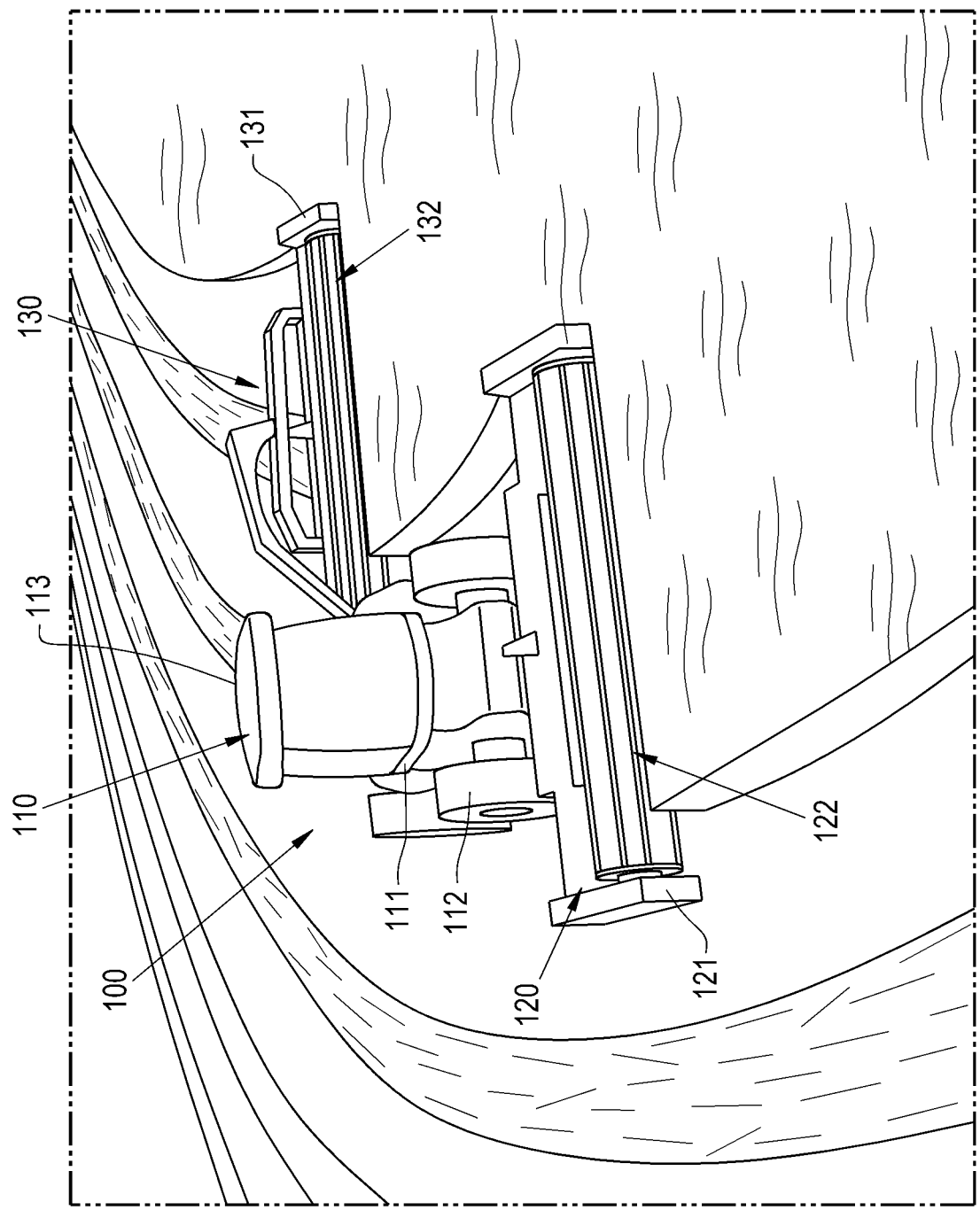
FIG. 1 illustrates a perspective view of an exemplary embodiment of an agricultural mowing assembly, the agricultural mowing assembly including an agricultural vehicle, a front mower conditioner, and a rear mower conditioner, in accordance with an exemplary embodiment of the present invention.

The terms "forward", "rearward", "left" and "right", when used in connection with the agricultural vehicle or mowing device and/or components thereof are usually determined with reference to the direction of forward operative travel, but they should not be construed as limiting. The terms "longitudinal" and "transverse" are determined with reference to the fore-and-aft direction of the agricultural vehicle or mowing device and are equally not to be construed as limiting. The terms "downstream" and "upstream" are determined with reference to the intended direction of crop material flow during operation, with "downstream" being analogous to "rearward" and "upstream" being analogous to "forward." As used herein, the term "mowing device" may refer to any agricultural cutting device that severs crop from the field, including a mower, a mower conditioner, or a header for a forage harvester or combine.

Referring now to the drawings, and more particularly to FIGS. 1-6, there is shown an agricultural mowing assembly 100 which includes an agricultural vehicle 110, at least one mowing device 120, 130, and a cut quality detection system 200. The agricultural mowing assembly 100 may include tandem front and rear mowing devices 120, 130, which operate in tandem to cut crop from the field. It should be appreciated that while only two mowers 120, 130 are illustrated and described herein, the present disclosure is equally applicable to mowing assemblies that incorporate only one mowing device or more than two mowing devices.

The agricultural vehicle 110 generally includes a chassis 111, a prime mover, wheels and/or tracts 112, and a cab 113 for housing the operator. The chassis 111 may at least partially carry the front and rear mowing devices 120, 130. The vehicle 110 can be in the form of a tractor, self-propelled windrower, or any other desired agricultural vehicle.

Figure 2:
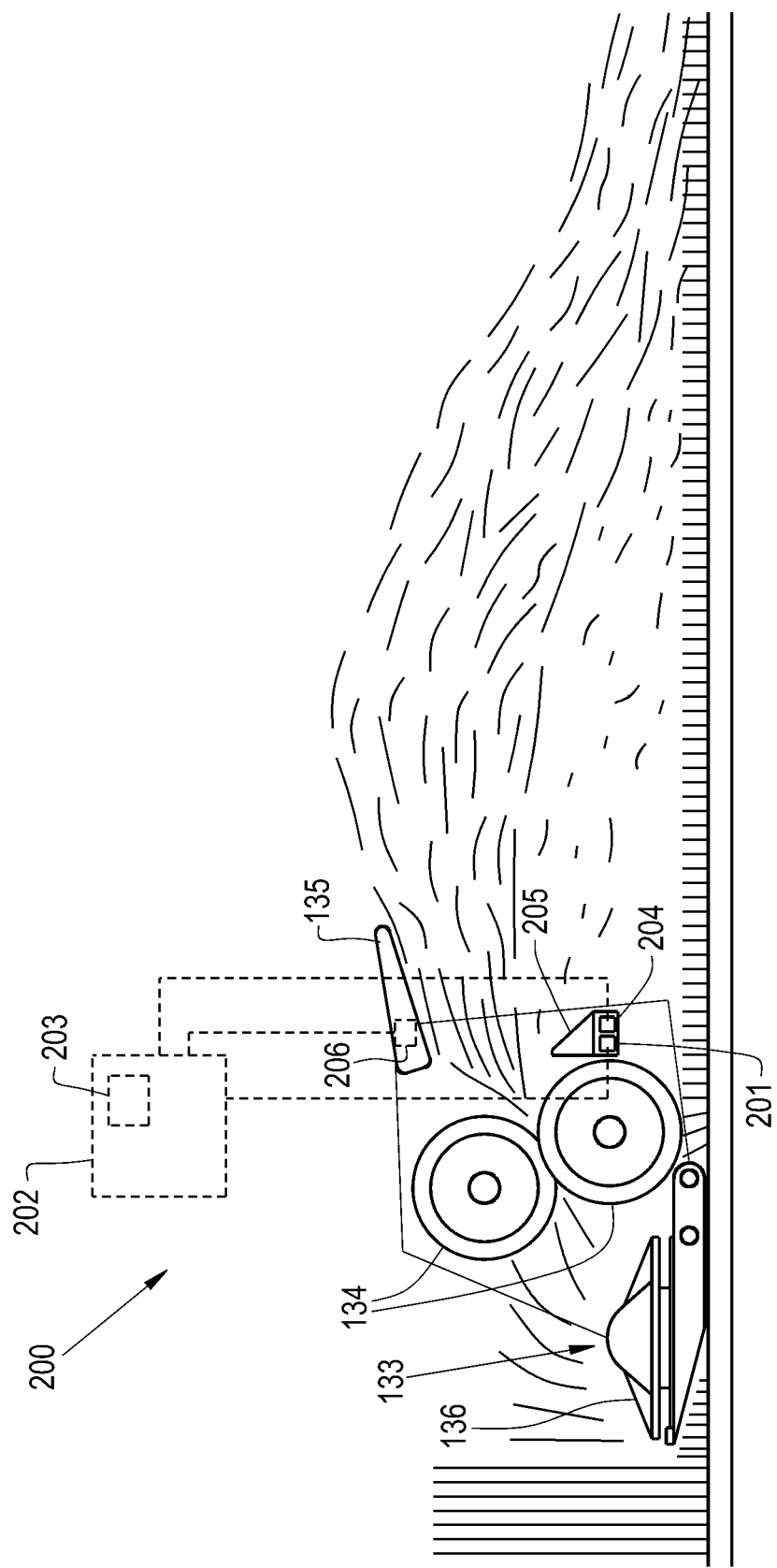
FIG. 2 illustrates a schematic view of a cut quality detection system of the agricultural mowing assembly of FIG. 1, in accordance with an exemplary embodiment of the present invention.
Figure 3:
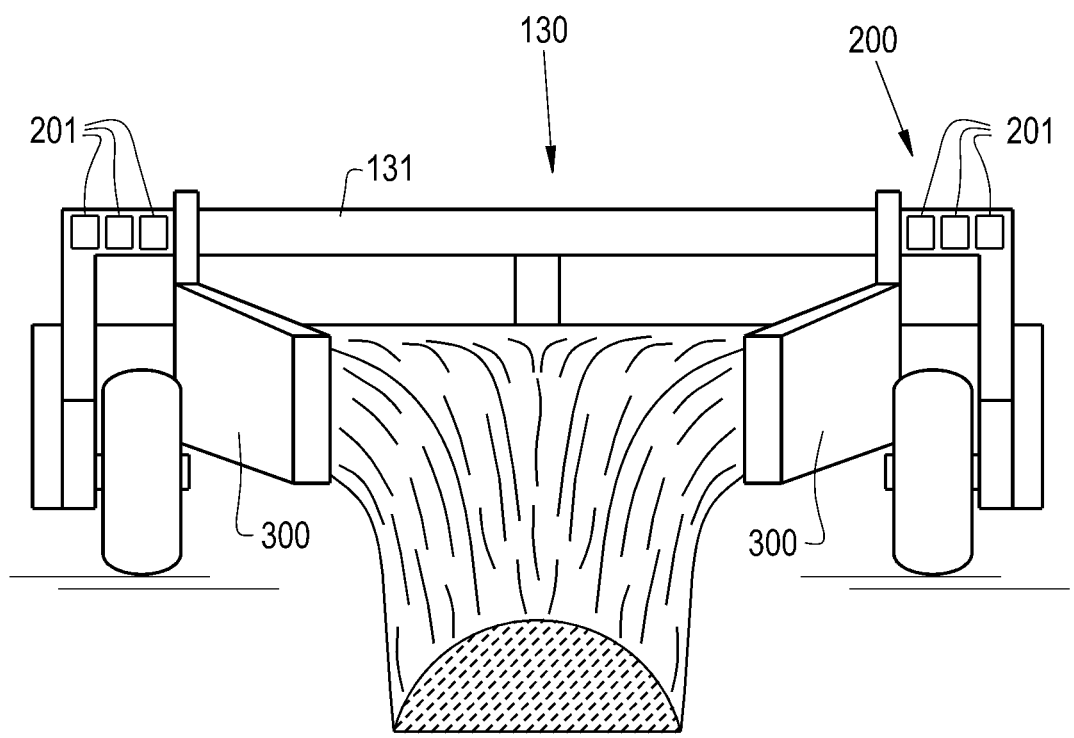
FIG. 3 illustrates a rear perspective view of portions of the rear mower conditioner of FIG. 1.

The front and rear mowing devices 120, 130 are connected to the chassis 111 of the agricultural vehicle 110. The front mowing device 120, for example, may be centrally mounted onto the driving vehicle 110 such that the agricultural vehicle 110 carries the front mowing device 120. The rear mowing device 130 may be coupled to a tongue coupler on the chassis 111 by a pivotable tongue (unnumbered) that can change the angular position of the rear mowing device 130 relative to the forward direction of travel. As shown, the mowing devices 120, 130 are in the form of mower conditioners; however, the mowing devices 120, 130 can be in the form of any desired mowing devices such as mowers, windrowers, headers, or windrow inverters. Each mowing device 120, 130 may include a frame 121, 131, a reel 122, 132 with tines rotatably connected to the frame 121, 131, a cutter bar 133, a conditioner 134, e.g. at least one flail conditioner or at least two conditioning rollers 134, and/or a crop gate 135, e.g. swath gate and/or windrow forming shields 300, for directing the crop material out of the mowing device 120, 130 and onto the field in a windrow or swath (as shown in FIGS. 2-3 with respect to the rear mowing device 130). The cutter bar 133 may be in the form of any desired cutter bar 133, such as a sickle bar or rotary disc cutter bar. For example, cutter bar 133 may be in the form of a rotary disc cutter bar 133 with multiple cutting disc heads 136.

The cut quality detection system 200 generally includes multiple sensors 201 for sensing color variations on the field and a controller 202 with a memory 203. The cut quality detection system 200 may also optionally include a lighting device 204, e.g. light bar 204, for illuminating the field, a protective hood 205 for protecting at least one sensor 201 and the light bar 204, and at least one color-baseline sensor 206 for sensing a baseline color of the crop material and/or field. The cut quality detection system 200 may also include a flexible curtain or apron connected to the rear of the protective hood 205 for shading and/or completely blocking out ambient light. It should be appreciated that the cut quality detection system 200 may be incorporated as part of the agricultural vehicle 110 and/or mowing device 120, 130. As described herein, the cut quality detection system 200 will be discussed with reference to the rear mower conditioner 130. However, either or both of the mowing device 120, 130 may include the cut quality detection system 200. Hence, only one or all of the mowing devices 120, 130 may include the cut quality detection system 200.

The sensors 201 may be mounted to the frame 131 of the mower conditioner 130 at any desired location. The sensors 201 may be mounted on the exterior and/or interior of the frame 131. The sensors 201 may sense any desired variations in color, highlights, and/or shadows. As can be appreciated, a color variation typically exists between the soil, the cut crop, i.e., the crop stubble or crop base, the bottom of the crop above the cutting point, and the top of the crop. Portions of the field that have been plowed may exhibit the brown or red color of the soil. Portions of the field with uncut or partially cut crop, e.g. a streak of at least partially cut crop material, may exhibit colors, such as green colors, which correspond to the bottom or top of the crop. Portions of the field that have been properly cut may exhibit brown and/or yellow colors of the soil and/or short crop stubble remaining on the field. Portions of the field with a swath or windrow thereon may exhibit colors which correspond to the bottom or top of the crop. Thereby, the sensors 201 may measure a first color associated with a cut surface of the field, upon the field being cut by the cutter bar 133, and a second color associated with the crop material remaining on the field, such as a crop streak. The sensors 201 may be in the form of optical sensors and may include at least two or more cameras and/or color sensors. For example, each sensor 201 can be a camera which captures multiple still images within a given time frame or a video recording, e.g.

a live stream, of the field. Additionally, for example, each sensor 201 can be a color sensor. The color sensors may be in the form of Red, Green, Blue (RGB) color sensors, Red, Yellow, Blue (RYB) color sensors, or any other desired color space sensors. Thus, the first color may be a red color which corresponds to the brown color of the dirt on the field, and the second color may be a green color which corresponds to the color of the crop material. It should be appreciated that the optical sensors 201 may not provide a high-quality image if desired since the color concentrations are being examined instead of the image sharpness. It should also be appreciated that any custom color space could be created for sensing the color of the field and crop material.

Figure 4:
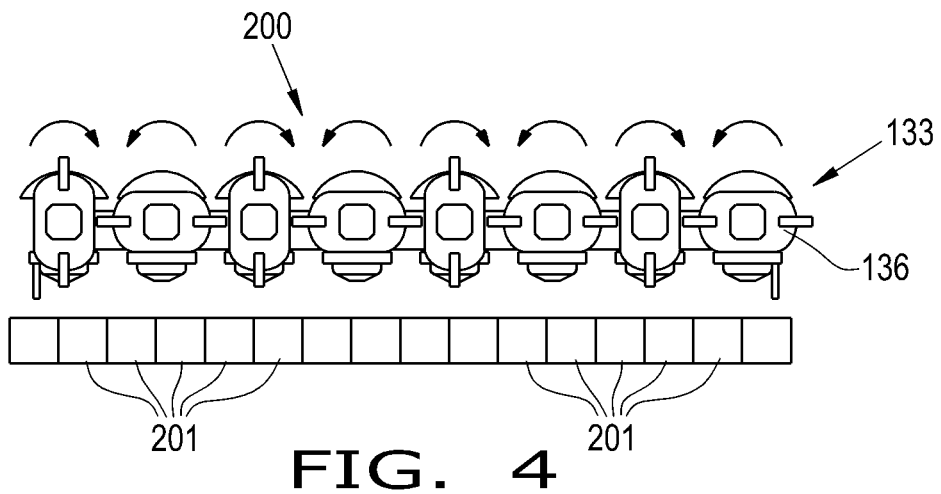
FIG. 4 illustrates a schematic view of the cut quality detection system of FIGS. 2-3, wherein the cut quality detection system includes multiple sensors associated with each cutting disc.
Figure 5:
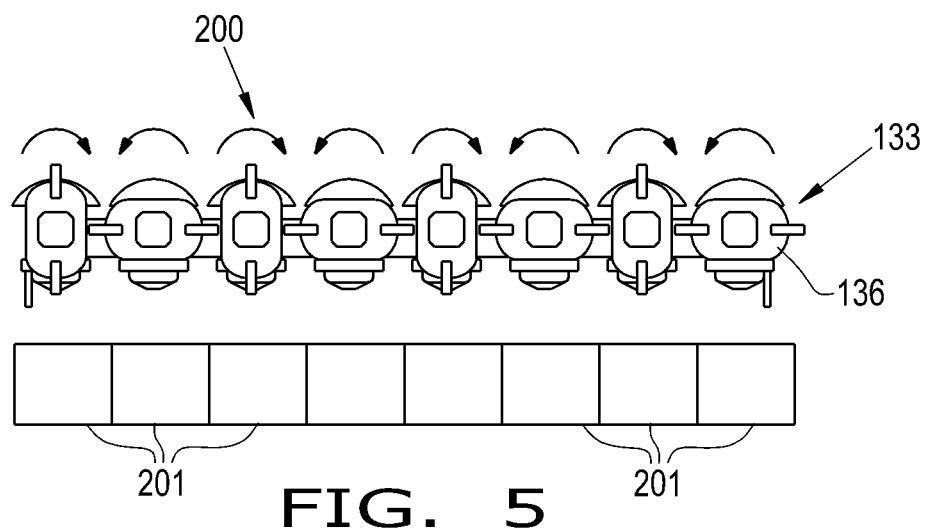
FIG. 5 illustrates a schematic view of the cut quality detection system of FIGS. 2-3, wherein the cut quality detection system includes one sensor associated with a respective cutting disc.
Figure 6:
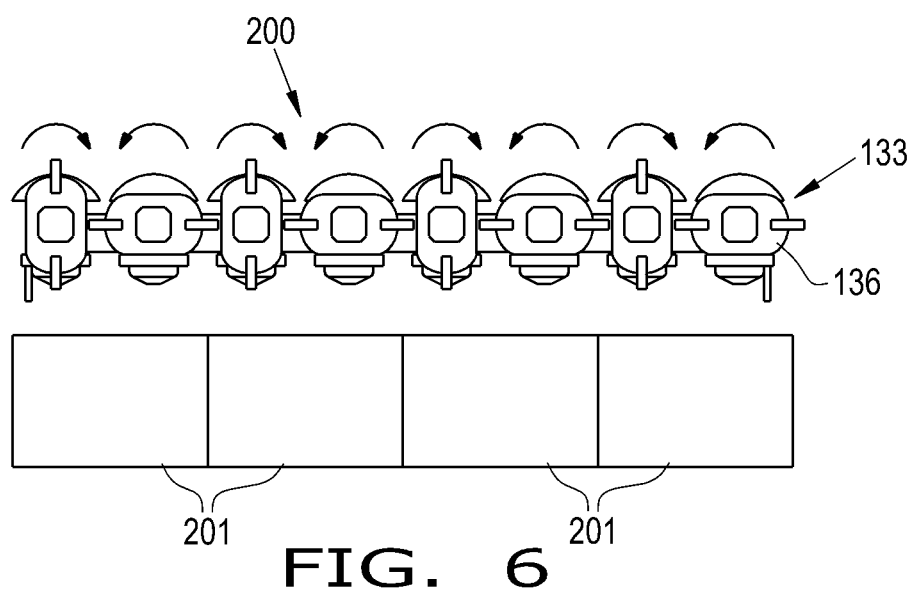
FIG. 6 illustrates a schematic view of the cut quality detection system of FIGS. 2-3, wherein the cut quality detection system includes one sensor associated with a juxtaposed pair of cutting discs.

The cut quality detection system 200 may include any desired number of sensors 201. The cut quality detection system 200 may include at least one sensor 201 at the left lateral end of the frame 131, at least one sensor 201 at the right lateral end of the frame 131, and at least one sensor 201 located at the middle of the frame 131 (FIGS. 2-3). The lateral end sensors 201 may be located on the exterior of the frame 131 and pointed downwardly toward the field. The at least one middle sensor 201 may be positioned in between the wheels, adjacent to and behind the cutter bar 133 and/or the conditioner 134, and underneath the crop flow. By way of example only, the cut quality detection system 200 may include three sensors: a left, right, and middle sensor. The single middle sensor may monitor an area which stretches across the full width of the cutter bar 133. Alternatively, the cut quality detection system 200 may include a left set of sensors 201 located leftward of the cutter bar 133 and/or the conditioner 134 on the left lateral end of frame 131, a middle set of sensors 201 located adjacent to and rearward of the conditioner 134 within the frame 131, and a right set of sensors 201 located rightward of the cutter bar 133 and/or the conditioner 134 on the right lateral end of the frame 131 (FIGS. 2-3). The middle set of sensors 201 may stretch across a width of the cutter bar 133. Furthermore, the cut quality detection system 200 may include multiple sensors 201 associated with a respective cutting disc head 136 or width head of the cutter bar 133 or small sections of the cutter bar width (FIG. 4). The cut quality detection system 200 may include one sensor 201 associated with each cutting disc head 136 or sections of the cutter bar width (FIG. 5). Additionally, cut quality detection system 200 may include one sensor 201 associated with two or more cuttings disc heads 136 or larger sections of the cutter bar width (FIG. 6).

The controller 202 is operably connected to the sensors 201, the light bar 204, and the crop-color-baseline sensor 206. The controller 202 may also be operably connected to a user interface within the cab 113, the hydraulic control system, the electrical control system, and/or the steering control system of the agricultural vehicle 110. The controller 202 may communicate with and control the functionality of the sensors 201, 206 and the light bar 204. The controller 202 may also analyze the data sensed by the sensors 201, 206 and determine a quality of the cutting performance of the cutter bar 133.

It should also be appreciated that the controller 202 may further determine uncut crop health or where the line of uncut crop material meets the cut crop stubble in the field. Furthermore, the controller 202 may determine an operational state of the cutter bar 133. The controller 202 may pinpoint a location of the cutter bar 133 which is cutting poorly and determine that this portion of the cutter bar 133 may be damaged and in need of repair or replacement. For instance, the viewing areas or zones of the sensors 201 may be numbered and the colors sensed therein, by the sensors 201, may be tracked and/or averaged by the controller 202. Thereby, the controller 202 may determine that a particular cutting disc head 136 or region of the cutter bar 133 is cutting poorly and/or damaged based upon which zone(s) may have a color that varies from the average color of the other zones. The controller 202 may notify the operator and/or a service center of the poor cutting performance and/or the damaged state of the cutter bar 133. The operator may accordingly adjust one or more of the operational parameters of the agricultural vehicle 110 and/or mowing device 120, 130, for example a ground speed, mower overlap, position of the vehicle 110 and/or mowing device 120, 130, cutting angle, etc. Additionally or alternatively, the controller 202 may autonomously adjust one or more of the operational parameters of the agricultural vehicle 110 and/or mowing device 120, 130 based upon the determined cutting performance and/or operational state of the cutter bar 133. Therefore, regardless of the operator's skill level, experience, or even physical presence, the mowing device 120, 130 may be operated at its peak cutting ability. The controller 202 may be a standalone controller or integrated into the existing hardware and/or software of the agricultural vehicle 110 and/or respective mowing device 120, 130.

The light bar 204 is connected to the frame 131. The light bar 204 can be connected to the frame 131 at a location that is next to the cutter bar 133, adjacent to the sensors 201, and underneath the protective hood 205. The light bar 204 illuminates the viewing area of at least one sensor 201, such as the middle set of sensors 201 located rearwardly of the cutter bar 133 and/or conditioner 134. The light bar 204 includes multiple lights arranged in an in-line array. The light bar 204 may include any desired lights, such as light emitting diodes (LEDs). The controller 202 may selectively turn on or off the light bar 204 as desired.

The protective hood 205 is connected to the frame 131. The protective hood 205 at least partially houses at least one sensor 201 and the light bar 204. The protective hood 205 may include a top and side walls which together at least partially cover the top and sides of the middle set of the sensors 201 and the light bar 204. The protective hood 205 may comprise any desired material, such as plastic and/or metal. The protective hood 205 may be shaped so that it does not disrupt crop flow exiting the mowing device 130.

The one or more color-baseline sensors 206 can be connected to and supported by the frame 131 at any desired location. The one or more color-baseline sensors 206 are also operably connected to the controller 202. Each color-baseline sensor 206 may be a crop-color-baseline sensor for sensing the baseline color of the crop material or a field-color-baseline sensor for sensing the color of a ground surface and/or the crop stubble on the ground after the field has been cut by the cutter bar 133. Thereby, the baseline sensor(s) 206 may sense the baseline color of the standing or cut crop material and/or the baseline color of the field, i.e., ground and/or the crop stubble. The baseline sensor(s) 206 may then communicate the sensed baseline color to the controller 202, which will then compare the sensed baseline color and the sensed color variations on the field from the sensors 201. Hence, the sensed baseline color of the cut crop may help the controller 202 more accurately determine a color on the field, sensed by the sensors 201, which is associated with the uncut crop material remaining on the field or the color of the ground and/or the crop stubble. If one or more color-baseline sensors 206 are configured as crop-color-baseline sensors, then the one or more crop-color-baseline sensors 206 may be mounted behind the cutter bar 133 and/or the conditioner 134 and underneath the crop stream for sensing the crop stream, in a slot or window on the crop gate 135 for sensing the crop material as it travels through the crop gate 135, on the sides of the frame 131 behind the cutter bar 133 and/or the conditioner 134 and directed inward toward the crop stream exiting the crop gate, on a middle section of the frame 131 directed rearwardly to the crop stream, on a side of the frame 131 directed toward the standing face of uncut crop material on the field, and/or on the front of the frame 131 directed toward the uncut crop material in front of the mower conditioner 130. If one or more color-baseline sensors 206 are configured as field-color-baseline sensors, then the field-color-baseline sensors may be mounted on a side of the frame 131 directed toward a cut surface, i.e., previous pass, on the field, on a middle section of the frame 131 directed rearwardly and downwardly to the field, and/or on the tongue directed toward the field in an area between the previous pass and the current pass. As shown, the color-baseline sensor 206 is in the form of a crop-color-baseline sensor 206 that is attached to the crop gate 135. Each color-baseline sensor 206 may comprise any desired optical sensor, such as a camera or color sensor.

Figure 7:
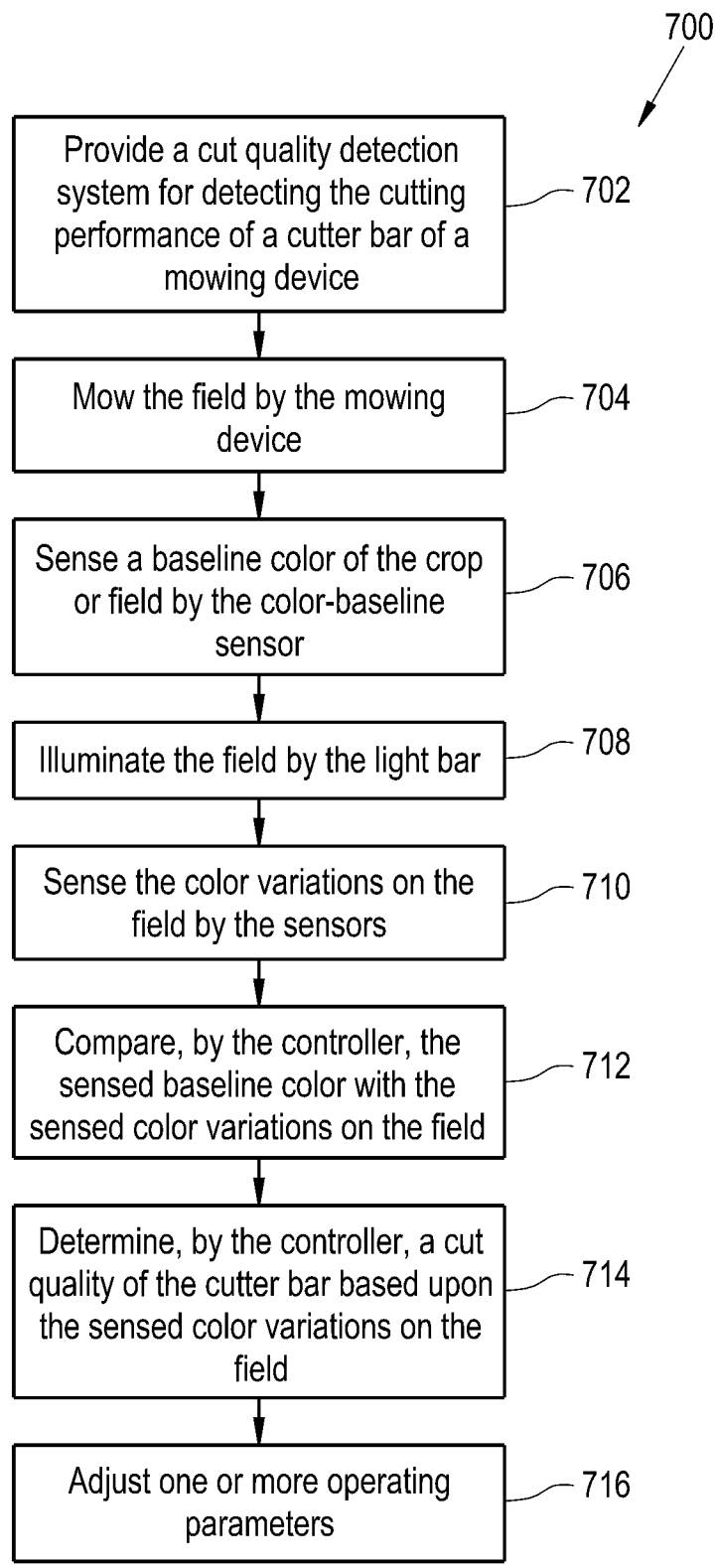
FIG. 7 illustrates a flow chart of a method for operating the agricultural mowing assembly, in accordance with an exemplary embodiment of the present invention.

Referring now to FIG. 7, there is shown a flowchart of a method 700 for operating an agricultural mowing assembly 100. The method 700 will be described in relation to the rear mowing device 130; however, it should be appreciated that the method 700 may be used to operate the front and/or rear mowing device 120, 130. The method 700 includes an initial step of providing the mowing assembly 100, and more particularly the cut quality detection system 200 for detecting the cutting performance of the cutter bar 133 of the mowing device 130 (at block 702). The method 700 may then include mowing the crop material by the mowing device 130 (at block 704). If the cut quality detection system 200 is equipped with a color-baseline sensor 206, then this color-baseline sensor 206 may sense a baseline color of the crop material or field (at block 706). Therewith, the color-baseline sensor 206 will provide the sensed baseline color to the controller 202, which will receive and store the sensed baseline color of the crop material or field. The controller 202 may activate the light bar 204 so that the light bar 204 illuminates the field (at block 708). The sensors 201 may sense the color variations on the field (at block 710). For example, the sensors 201 may sense a first, field color associated with a cut surface of the field upon the field being cut by the cutter bar 133 and a second, crop color associated with the crop material remaining on the field. Each sensor 201 may also sense the color variations on the field in respective viewing zones which respectively correspond to sections of the cutter bar 133. Therewith, the sensors 201 may send the sensed color variations, and the controller 202 may receive the sensed color variations form the sensors 201. If the cut quality detection system 200 is equipped with the color-baseline sensor 206, then the controller 202 will compare the sensed baseline color of the crop material and the sensed color variations on the field in order to obtain a more accurate reading and easily distinguish between the field color and the crop color (at block 712). Then, the controller 202 may determine a cut quality of the cutter bar 133 based upon the sensed color variations on the field (at block 714). In more detail, the controller 202 may instantly analyze the luminosity histogram and/or the red, green, blue RGB histograms of the livestream or image from each sensor 201. Therein, the controller 202 will determine an amount of a particular color present and compare the colors to calculate a cutting performance of the cutter bar 133 based upon which color is dominant. For instance, if the RGB wavelengths are consistent across the width of the cutter bar 133 and further if a desired amount of a red wavelength, i.e., field color, is greater than an amount of a green wavelength, i.e., crop color, then the controller 202 will determine that the cutter bar 133 has a good quality cutting performance, wherein the field is being evenly cut across the full width of the cutter bar 133. Additionally, if the RGB wavelengths are inconsistent across the width of the cutter bar 133 and/or if an undesired amount of the crop color is greater than a desired amount of the field color and/or an acceptable threshold amount of crop color, then the controller 202 will determine that the cutter bar 133 has a poor-quality cutting performance. This scenario may occur if a streak of entirely or partially uncut crop exits within one or more livestreams and/or images sensed by the sensors 201. Furthermore, if the RGB wavelengths are inconsistent across the width of the cutter bar 133 and one or more sensors 201 indicate that a field color within a given livestream or image is greater than the all of the other livestreams or images and/or a set threshold amount, then the controller 202 will determine that the cutter bar 133 has a poor-quality cutting performance, wherein the cutter bar 133 may be cutting too close to the field or there exists an undesired skid shoe trail. Furthermore, the controller 201 may perform a step of pinpointing a particular section of the cutter bar that is cutting poorly by determining which corresponding viewing zone, sensed by the sensors 201, has a differing color from the average color of the other remaining viewing zones. The method 700 may also include a step of adjusting one or more operating parameters of the agricultural vehicle 100 and/or the respective mowing device 130 (at block 716). As can be appreciated, the controller 202 may further notify the operator via an indicator, such as a light, sound, and/or display icon on a user interface, of a good and/or poor-quality cutting performance and further provide the location of a missing or damaged cutting section, e.g. broken knife, of the cutter bar 133. Accordingly, the operator may adjust the operating parameter(s) as desired and/or inspect and replace the damaged or missing components of the cutter bar 133. Additionally or alternatively, the controller 202 may automatically adjust the operating parameter(s) dependent upon the determined cutting performance.

It is to be understood that the steps of the method 700 are performed by the controller 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 202 described herein, such as the method 700, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 700 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An agricultural mowing assembly, comprising:
   an agricultural vehicle;
   at least one mowing device connected to the agricultural vehicle and comprising a frame and a cutter bar movably connected to the frame, and the cutter bar being configured for mowing a crop material in a field; and
   a cut quality detection system, comprising:
      a plurality of sensors mounted to the frame and configured for sensing color variations on the field; and
      a controller operably connected to the plurality of sensors and receiving the sensed color variations on the field from the plurality of sensors, and the controller being configured for determining a cut quality of the cutter bar based upon the sensed color variations on the field.

2. The agricultural mowing assembly of claim 1, wherein the plurality of sensors is configured for sensing a first color associated with a cut surface of the field upon the field being cut by the cutter bar and a second color associated with the crop material remaining on the field, and the controller is configured for determining the cut quality of the cutter bar by comparing an amount of the first color and an amount of the second color.

3. The agricultural mowing assembly of claim 1, wherein the cut quality detection system comprises a lighting device connected to the frame adjacent to the plurality of sensors, and the lighting device is configured for illuminating the field.

4. The agricultural mowing assembly of claim 3, wherein the lighting device comprises a plurality of lights arranged in an array.

5. The agricultural mowing assembly of claim 3, wherein the cut quality detection system further comprises a protective hood connected to the frame, and the protective hood at least partially houses at least one sensor of the plurality of the sensors and the lighting device.

6. The agricultural mowing assembly of claim 1, wherein the cut quality detection system further comprises at least one color-baseline sensor supported by the frame and operably connected to the controller, and the at least one color-baseline sensor is configured for sensing a baseline color of at least one of the crop material and the field and for providing the sensed baseline color to the controller, and the controller is configured for comparing the sensed baseline color and the sensed color variations on the field from the plurality of sensors.

7. The agricultural mowing assembly of claim 6, wherein the at least one mowing device further comprises a crop gate connected to the frame and configured for directing the crop material out of the at least one mowing device and onto the field, and the at least one color-baseline sensor is connected to the crop gate and is further configured for sensing the baseline color of the crop material as the crop material travels through the crop gate.

8. The agricultural mowing assembly of claim 1, wherein the at least one mowing device is in the form of at least one mower conditioner that further comprises a conditioner, and the plurality of sensors comprises a left set of sensors located leftward of the conditioner, a middle set of sensors located adjacent to and rearward of the conditioner, and a right set of sensors located rightward of the conditioner.

9. The agricultural mowing assembly of claim 1, wherein the plurality of sensors comprises two or more of a camera and a color sensor.

10. The agricultural mowing assembly of claim 1, wherein each sensor of the plurality of sensors is configured for sensing a color on the field in a viewing zone which corresponds to a section of the cutter bar, and the controller is configured for pinpointing the section of the cutter bar which is cutting poorly by determining which corresponding viewing zone has a differing color from the other viewing zones.

11. A method for operating an agricultural mowing assembly, comprising:
   providing an agricultural vehicle, at least one mowing device connected to the agricultural vehicle, the at least one mowing device comprising a frame and a cutter bar movably connected to the frame, and the cutter bar being configured for mowing a crop material in a field, and a cut quality detection system, the cut quality detection system comprising a plurality of sensors mounted to the frame and a controller operably connected to the plurality of sensors;
   mowing the field by the at least one mowing device;
   sensing, by the plurality of sensors, color variations on the field; and
   determining, by the controller, a cut quality of the cutter bar based upon the sensed color variations on the field.

12. The method of claim 11, wherein the step of sensing by the plurality of sensors comprises sensing a first color associated with a cut surface of the field upon the field being cut by the cutter bar and sensing a second color associated with the crop material remaining on the field.

13. The method of claim 12, wherein the step of determining the cut quality of the cutter bar by the controller further comprises comparing an amount of the first color and an amount of the second color.

14. The method of claim 11, wherein the cut quality detection system comprises a lighting device connected to the frame adjacent to the plurality of sensors, and the method further comprises illuminating the field by the lighting device.

15. The method of claim 14, wherein the lighting device comprises a plurality of lights arranged in an array.

16. The method of claim 14, wherein the cut quality detection system further comprises a protective hood connected to the frame, and the protective hood at least partially houses at least one sensor of the plurality of the sensors and the lighting device.

17. The method of claim 11, wherein the cut quality detection system further comprises at least one color-baseline sensor supported by the frame and operably connected to the controller, and the method further comprises sensing, by the at least one crop-color-baseline, a baseline color of at least one of the crop material and the field and for providing the sensed baseline color to the controller, and the step of determining the cut quality of the cutter bar by the controller further comprises comparing the sensed baseline color and the sensed color variations on the field from the plurality of sensors.

18. The method of claim 17, wherein the at least one mowing device further comprises a crop gate connected to the frame and configured for directing the crop material out of the at least one mowing device and onto the field, and the at least one color-baseline sensor is connected to the crop gate and is further configured for sensing the baseline color of the crop material as the crop material travels through the crop gate.

19. The method of claim 11, wherein the at least one mowing device is in the form of at least one mower conditioner that further comprises a conditioner, and the plurality of sensors comprises a left set of sensors located leftward of the conditioner, a middle set of sensors located adjacent to and rearward of the conditioner, and a right set of sensors located rightward of the conditioner.

20. The method of claim 11, wherein the step of sensing by the plurality of sensors further comprises sensing, by each sensor of the plurality of sensors, a color on the field in a viewing zone which corresponds to a section of the cutter bar, and the method further includes a step of pinpointing, by the controller, the section of the cutter bar which is cutting poorly by determining which corresponding viewing zone has a differing color from the other viewing zones.

* * * * *